(12) United States Patent  
Boutami et al.

(10) Patent No.: US 11,874,217 B2
(45) Date of Patent: Jan. 16, 2024

(54) DEVICE FOR PHOTOACOUSTIC CHARACTERISATION OF A GASEOUS SUBSTANCE AND METHOD FOR MANUFACTURING SUCH A DEVICE

(71) Applicant: COMMISSARIAT À L'ENERGIE ATOMIQUE ET AUX ENERGIES ALTERNATIVES, Paris (FR)

(72) Inventors: Salim Boutami, Grenoble (FR); Maryse Fournier, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 142 days.

(21) Appl. No.: 17/110,871

(22) Filed: Dec. 3, 2020

(65) Prior Publication Data

US 2021/0181089 A1 Jun. 17, 2021

(30) Foreign Application Priority Data

Dec. 6, 2019 (FR) ...................................... 1913875

(51) Int. Cl.
*G01N 21/17* (2006.01)
*G01N 21/3504* (2014.01)
(Continued)

(52) U.S. Cl.
CPC ..... *G01N 21/1702* (2013.01); *G01N 21/3504* (2013.01); *G01N 29/036* (2013.01); *G01N 29/2425* (2013.01); *G01N 2021/1704* (2013.01)

(58) Field of Classification Search
CPC ....... G01N 21/1702; G01N 2021/1704; G01N 29/2425; G01N 29/036; G01N 2021/1708
(Continued)

(56) References Cited

U.S. PATENT DOCUMENTS 4,818,882 A * 4/1989 Nexo .................. G01N 21/1702
250/343
6,006,585 A * 12/1999 Forster ............... G01N 21/1702
73/24.01
(Continued)

FOREIGN PATENT DOCUMENTS

DE 102019134267 A1 * 6/2021 ......... G01N 29/2425
EP 1743576 A1 * 1/2007 ........... A61B 5/0095
(Continued)

OTHER PUBLICATIONS

Stefan Palzer, Photoacoustic-Based Gas Sensing: A Review, Sensors, www.mdpi.com/journal/sensors, May 11, 2020, 22 pg(s) (Year: 2020).*

(Continued)

*Primary Examiner* — Stephanie E Bloss
*Assistant Examiner* — Kevin C Butler
(74) *Attorney, Agent, or Firm* — Pillsbury Winthrop Shaw Pittman LLP

(57) ABSTRACT

A device for the photoacoustic characterisation of a gaseous substance, includes a chamber intended to contain the gaseous substance to characterise and into which a light beam is injected. The chamber is delimited, inter alia, by an inner face, on which a part of the light beam is reflected. This inner face is etched so as to have recesses, each recess being delimited laterally by a lateral surface of which a part at least is tilted, with respect to an average plane of the inner face, by a given tilt angle ($\alpha$).

17 Claims, 9 Drawing Sheets

(51) Int. Cl.
  *G01N 29/24* (2006.01)
  *G01N 29/036* (2006.01)
(58) Field of Classification Search
  USPC .......................................................... 73/24.02
  See application file for complete search history.

(56) References Cited

U.S. PATENT DOCUMENTS

| | | | | |
|---|---|---|---|---|
| 11,002,664 | B2* | 5/2021 | Boutami | G01N 21/3504 |
| 2006/0254340 | A1* | 11/2006 | Baraket | G01N 29/2425 |
| | | | | 73/24.01 |
| 2017/0242158 | A1* | 8/2017 | Muhr | G02B 1/02 |
| 2021/0131963 | A1* | 5/2021 | Yagi | G01N 21/3504 |
| 2021/0181089 | A1* | 6/2021 | Boutami | G01N 29/222 |
| 2021/0246016 | A1* | 8/2021 | Pindl | B81C 1/00317 |
| 2022/0120669 | A1* | 4/2022 | Kang | G01N 21/1702 |
| 2022/0178816 | A1* | 6/2022 | Ma | G01N 21/1702 |

FOREIGN PATENT DOCUMENTS

| | | | | |
|---|---|---|---|---|
| EP | 3783339 | A1 * | 2/2021 | ......... G01N 21/1702 |
| EP | 3832301 | A1 * | 6/2021 | ......... G01N 21/1702 |
| FR | 3019653 | A1 * | 10/2015 | ............. G01N 21/03 |
| GB | 2 190 998 | A | 12/1987 | |
| GB | 2527422 | A * | 12/2015 | ............... G02B 1/02 |
| WO | WO 02/088698 | A1 | 11/2002 | |
| WO | WO-02088698 | A1 * | 11/2002 | ......... G01N 21/1702 |
| WO | WO 2009/007875 | A2 | 1/2009 | |
| WO | WO-2009007875 | A2 * | 1/2009 | ......... G01N 21/1702 |
| WO | 3 019 653 | A1 | 10/2015 | |

OTHER PUBLICATIONS

Search Report as issued in French Patent Application No. 1913875, dated Jun. 22, 2020
Rouxel, J., et al., "Miniaturized differential Helmholtz resonators for photoacoustic trace gas detection," Sensors and Actuators B: Chemical, vol. 236, (2016), pp. 1104-1110.
Glière, A., et al., "A Coupled Model for the Simulation of Miniaturized and Integrated Photoacoustic Gas Detector," Int J Thermophys (2013) vol. 34, pp. 2119-2135.
Danel, J.-S., "Micro-machining of monocrystalline materials," Techniques de l'Ingenieur, Jul. 1998, 21 pages.
"Wet-Chemical Etching of Silicon and $SIO_2$," MicroChemicals, Basics of Microstructuring, Retrieved from the Internet: URL: <https://www.microchemicals.com/downloads/application_notes.html>, Retrieved on Dec. 3, 2020.

* cited by examiner

DEVICE FOR PHOTOACOUSTIC CHARACTERISATION OF A GASEOUS SUBSTANCE AND METHOD FOR MANUFACTURING SUCH A DEVICE

CROSS-REFERENCE TO RELATED APPLICATIONS

This application claims priority to French Patent Application No. 1913875, filed Dec. 6, 2019, the entire content of which is incorporated herein by reference in its entirety.

TECHNICAL FIELD OF THE INVENTION

The technical field of the invention is that of devices for photoacoustic characterisation of a gaseous substance, for example for detecting the presence of one or more gaseous elements in this gaseous substance, or to measure the concentration of one or more of these elements.

The invention relates in particular to such a device, integrated on a semiconductor chip. The invention also relates to a method for manufacturing such a device.

TECHNOLOGICAL BACKGROUND OF THE INVENTION

To measure the concentration of a particular element present in low quantity in a gaseous mixture (or in a gas), it is known to fill a chamber with the gaseous mixture in question, then to inject a light radiation into this chamber, the light radiation being chosen so as to be absorbed by the element of which it is wished to measure the concentration, preferably selectively (that is to say only by this element). This light radiation thus has a spectrum which, in general, is situated in the mid-infrared, for example between 3 and 10 microns. On absorbing this radiation, the gaseous mixture heats up. The luminous power of the injected radiation is then modulated, to a modulation frequency situated in the sonic or ultrasonic domain. The heating up in question is thus also time modulated which, in the gaseous mixture, generates an acoustic wave having the modulation frequency in question. The amplitude of this acoustic wave, which provides information on the concentration of the element to detect, is measured using a microphone. To make such a detection device more sensitive, the modulation frequency may be chosen equal to or close to a resonance frequency of the acoustic cavity that constitutes the chamber.

These last few years have seen the development of compact devices for detecting or measuring using such a photoacoustic effect, these devices being made of semiconductors using manufacturing techniques derived from the microelectronics industry.

The document FR 3019653, for example, describes an integrated photoacoustic detection device, produced by etching two silicon substrates then by sealing them one on the other to delimit chambers intended to receive the gaseous substance to be characterised (this device, which is of the "double Helmholtz differential" type, comprises two chambers connected by capillaries).

The light source employed, in this case a QCL (Quantum Cascade Laser) which emits in the mid-infrared, is optically coupled to one of these chambers by an integrated waveguide. On the chamber's side of this guide, the guide has a widened end and is provided with a so-called decoupling diffraction grating, which enables to inject the light radiation into the chamber in the form of a light beam which, at least in one direction, is not very divergent. This light beam next propagates in the chamber, while being reflected on an upper face of the chamber, made reflective by a gold layer deposited on this face.

In the absence of a reflective coating, an important part of the power of the light beam in question would be lost, when reflecting on this upper face. Indeed, during reflection on a bare silicon face (that is to say without reflective coating), an important part of the light beam would be transmitted into the silicon, then would pass through it to finally come out of the device (it will be noted that, at the wavelengths employed, silicon is essentially transparent), thus reducing the average luminous power which, in the chamber heats up the gas, thus reducing the detection sensitivity of the device.

Making one or more faces of the chamber reflective thanks to a metal deposition thus enables to better confine the light radiation in the chamber. But, on the other hand, these metal layers deposited on these faces are sources of noise, of a photoacoustic type, which can impair the operation of the device and which reduce its sensitivity.

Indeed, even in the mid-infrared, the power reflection coefficient, on a gold layer, is around 98%. And as soon as the layer has a thickness of around one hundred or so nanometres, its coefficient of transmission is close to 0%. The fraction of the incident luminous power that is not reflected by the layer, which represents around 2% of this incident power, is thus absorbed in the layer, which causes the layer to heat up, modulated at the aforementioned modulation frequency.

This modulated heating of the gold layer is the source of a parasitic acoustic wave, which is added to the acoustic wave produced by the heating up of the gas to be detected. A parasitic absorption of 2% at the level of a reflective face of the cavity may appear small, but it may in fact notably impair the measurement because the absorption in the gaseous substance to characterise is generally quite low as well.

In this context, it would thus be desirable to have a device for the photoacoustic characterisation of a gaseous substance, which enables efficient confinement of the light radiation, in the chamber intended to receive the gaseous substance to characterise, while avoiding the problem of photoacoustic noise that a metal reflective coating would cause.

SUMMARY OF THE INVENTION

To resolve at least in part the aforementioned problem, a device is proposed for the photoacoustic characterisation of a gaseous substance, the device comprising:
  a light source, emitting a light radiation, and
  a chamber intended to contain the gaseous substance to characterise, the chamber being delimited, inter alia, by a first wall, formed in a material at least partially transparent to said radiation, said wall having:
    an inner face, substantially flat, situated on the side of the chamber, and
    an outer face, a major part of the outer face being flat, contained in a same plane, and substantially parallel to an average plane of the inner face.

The light source is optically associated with the chamber so as to inject said light radiation into the chamber, in the form of a light beam, a part at least of the light beam being reflected on the inner face of the first wall.

And, in a remarkable manner, the inner face of the first wall is etched so as to have recesses, each recess being delimited laterally by a lateral surface, a part of said lateral surface, which is illuminated by said light beam, being tilted, with respect to the average plane of said inner face, by a given tilt angle α.

Here, the tilt angle α satisfies the following inequality F1:

$$\alpha - \sin^{-1}\left(\frac{\sin\alpha}{n}\right) > i_C. \tag{F1}$$

$i_C$ is the critical angle of total internal reflection in said material and n is the optical index of said material.

In a device which would comprise a first wall 110 of which the inner face 120 would be completely flat, without the recesses mentioned above, a part of the light beam which reaches this inner face would come out of the device after having passed through the first wall, as is represented in FIG. 1.

Indeed, without the recesses in question, a light ray RA that reaches the inner face 120 of the first wall 110 would be refracted by it. Then, after having passed through this wall, this ray would encounter an outer face 130 of the wall 110 under an angle necessary smaller than the critical angle of total internal reflection, whereas the inner 120 and outer 130 faces of this wall 110 are substantially parallel with each other. This light ray RA would then come out of the device through the outer face 130 in question, which would cause, in the chamber, a loss of luminous power.

Etching recesses, of which the lateral surface is tilted with respect to the average plane P1 of the inner face 12 (FIG. 2), enables, for a light ray RB which encounters this lateral surface, to increase the angle of incidence with which this ray encounters, next, the outer face 13 of the first wall 11 (compared to an inner face which would be exempt of recesses).

And it is possible to show by calculations of refracted angles that any light ray, which is refracted by the part of the lateral surface of the recess tilted by the tilt angle α, next reaches the outer face 13 of the first wall 11 with an angle of incidence $i_R$ which satisfies the following condition F2:

$$\alpha - \sin^{-1}\left(\frac{\sin\alpha}{n}\right) < i_R < \alpha + \sin^{-1}\left(\frac{\cos\alpha}{n}\right). \tag{F2}$$

Choosing the tilt angle α sufficiently large, so that it satisfies the inequality F1, thus enables the angle of incidence $i_R$ to be greater than the critical angle $i_C$ of total internal reflection, $i_R > i_C$, and this is so whatever the initial direction (in the chamber) of the light ray considered.

Since the angle of incidence $i_R$ is then greater than the critical angle $i_C$, each of these light rays is totally reflected by the outer face 13 of the first wall (by total internal reflection), and is thus sent back in the direction of the chamber.

With this device, the reflection of the light radiation, which makes it possible to send it back to the chamber, is achieved by total internal reflection. Unlike reflection on a metal layer, this reflection is thus realised without absorption, which is particularly interesting since it avoids the photoacoustic noise mentioned above.

It will be noted that the critical angle $i_C$ of total internal reflection designates, as is customary, the limit angle of incidence beyond which a light ray is totally reflected, at the interface between the material in question and the space situated beyond the first wall, on the outside of the device. When this space is occupied by a substance having an optical index close to 1, such as air or another gaseous substance, the expression of the critical angle $i_C$ is given by formula F3 below, where n is the optical index of the material forming the first wall, at the average wavelength of the light radiation emitted by the source:

$$i_C = \sin^{-1}(1/n) \tag{F3}$$

If the outer face of the first wall was covered with another material, having an optical index n2 (optical index at the average wavelength of the light radiation in question), the expression of the critical angle $i_C$ would be given by formula F4 below:

$$i_C = \sin^{-1}(n2/n) \tag{F4}$$

The inner face of the first wall is substantially flat, in the sense that an entire part of this inner face is flat, situated in a same average plane P1 (FIG. 2). But this face also comprises hollow portions corresponding to the recesses in question. In other words, the inner face comprises several flat portions situated in the same plane which constitutes the average plane P1, as well as portions situated outside of this plane (at the level of the recesses). The portions of the inner face situated in the average plane P1 may for example represent the major part of the area of this inner face (area measured in projection on the average plane P1).

The tilt angle α is the angle formed between, on the one hand, the average plane P1, and, on the other hand, the part of the lateral surface of the aforementioned recess, which is illuminated by the light beam injected into the cavity (part which may correspond for example to a flat facet forming one of the portions of the lateral surface of the recess). As illustrated in FIG. 2, the tilt angle α designates more specifically the angle of opening of the hollow angular sector (without material) which extends from the average plane P1 up to the part of the aforementioned lateral surface. Thus, as an example, if the recesses were extremely shallow, the tilt angle α would be close to 0 degrees.

Here, the tilt angle α is below 90 degrees.

Apart from the characteristics described above, the device that has been described may comprise one or more optional and non-limiting characteristics among the following, considered individually or according to all technically possible combinations thereof:
- the major part of the inner face of the first wall, or even the totality of this face, is exempt of metal;
- the major part of the outer face of the first wall, or even the totality of this face, is exempt of metal;
- the entire part of the outer face which is situated opposite said recess, or at least the essential (that is to say the major part) of this part of the outer face is flat;
- the outer face is flat;
- the lateral surface that delimits the recess considered is formed of several flat facets, for at least some of said recesses;
- each of said facets is tilted, with respect to the average plane of said inner face, by said tilt angle α;
- at least some of said recesses, of which the lateral surface is formed of several flat facets, are produced in the form of rectilinear grooves having a V-shaped section;
- said grooves are parallel with each other, and in which each of said grooves extends along a transversal axis (y) which forms, with a mean direction of propagation of the light beam injected into the chamber, an angle comprised between 70 and 90 degrees;
- the mean direction of propagation of the light beam is parallel to the inner face of the first wall, to some more or less 20 degrees;

at least some of said recesses, of which the lateral surface is formed of several flat facets, have a hollow pyramid shape with a square or rectangular base;

said pyramids are each arranged such that one of the sides of their base is parallel to a same transversal axis, and in which this transversal axis forms, with a mean direction of propagation of the light beam injected into the chamber, an angle comprised between 70 and 90 degrees;

the first wall is formed in an essentially monocrystalline substrate, wherein the average plane of said inner face, and said flat facets, are parallel to different crystalline planes of said substrate;

the substrate is formed of silicon, in which the average plane of said inner face is parallel to a crystalline plane of which the Miller indices are 1,0,0 or 1,1,0 and said facets are parallel to crystalline planes of which the Miller indices are 1,1,1, or 1,1,−1, or 1,−1,1 or −1,1,1;

the chamber is also delimited by a second wall formed in said material, the second wall having an inner face, substantially flat, situated on the side of the chamber, and an outer face, substantially flat and parallel to the inner face of the second wall, the inner face of the second wall being etched so as to also have recesses, each recess being delimited laterally by a lateral surface, a part of said lateral surface, which is illuminated by said light beam, being tilted, with respect to an average plane of the inner face of the second wall, by said tilt angle $\alpha$.

It may also be provided that said grooves, or said pyramids, are arranged such that two grooves, or two pyramids, situated one following the other along a longitudinal axis, are spaced apart, along the longitudinal axis(x), by a distance $d_i = x_{i+1} - x_i$ which is equal, at least within 20%, to the following quantity $d_{i,opt}$:

$$d_{i,opt} = H \left[ \frac{1}{\tan\alpha} + \tan\left[\alpha + \sin^{-1}\left[\cos\left[\frac{\alpha + \tan^{-1}\left(\frac{W \cdot \tan\alpha}{x_i \tan\alpha + H}\right)}{n}\right]\right]\right]\right].$$

In the formula above, the coordinates $x_i$ and $x_{i+1}$ denote the respective positions, along the longitudinal axis, of the two bottoms of said two V-shaped grooves, or denote the respective positions, along the longitudinal axis, of the two summits of said two pyramids, the longitudinal axis, which is orthogonal to said transversal axis and which is contained in the average plane of said inner face, has an origin which is situated upright a point of injection of said light radiation, H is the depth of the V-shaped grooves, or pyramids, measured perpendicularly to the average plane of said inner face, and W is the distance between the point of injection of the light radiation and the average plane of said inner face, measured perpendicularly to said average plane.

Another aspect of the invention relates to a method for manufacturing a device for the photoacoustic characterisation of a gaseous substance, such as described above, the method comprising the following steps:

producing a chamber intended to contain the gaseous substance to characterise, the chamber being delimited, inter alia, by a first wall, formed in a material, said wall having an inner face, substantially flat and situated on the side of the chamber, as well as an outer face, the major part of the outer face being flat, contained in a same plane, and substantially parallel to an average plane of said inner face, and producing, or mounting on the device, a light source that emits a light radiation, the light source being optically associated with the chamber so as to inject said light radiation into the chamber, in the form of a light beam, a part at least of the light beam being reflected on the inner face of the first wall.

In a remarkable manner, the step of producing the chamber comprises a step of producing recesses, etched on the inner face of the first wall, each recess being delimited laterally by a lateral surface, a part of said lateral surface, which is illuminated by said light beam, being tilted, with respect to the average plane of said inner face, by said tilt angle $\alpha$.

Apart from the characteristics described above, the method that has been described may comprise one or more optional and non-limiting characteristics among the following, considered individually or according to all technically possible combinations thereof:

the first wall is formed in a first substrate, and the step of producing the chamber comprises a step of etching a half-cavity, in the first substrate, the half-cavity having a bottom forming said inner face, the step of producing said recesses being executed after the step of etching the half-cavity;

the first substrate is formed of essentially monocrystalline silicon, the cavity bottom is parallel to a crystalline plane of which the Miller indices are 1,0,0 or 1,1,0, and the step of producing said recesses comprises the following operations:

producing a protective layer covering the lateral faces of said half-cavity, depositing a protective mask on the bottom of said half-cavity, the mask being deposited through a stencil and comprising orifices coinciding with the openings of the recesses to be etched, wet etching the first substrate, by action of potassium hydroxide or tetramethylammonium hydroxide;

removing the mask and the protective layer.

the chamber being further delimited by a second wall, which is formed in a second substrate made of said material, the second wall having an inner face, substantially flat, situated on the side of the chamber, and an outer face, substantially flat and parallel to the inner face of the second wall, the step of producing the chamber further comprises:

a step of producing recesses, etched on the inner face of the second wall, each recess being delimited laterally by a lateral surface, a part of said lateral surface, which is illuminated by said light beam, being tilted, with respect to an average plane of the inner face of the second wall, by said tilt angle $\alpha$, and a sealing of the second substrate on the first substrate, so that the respective inner faces of the first wall and the second wall are situated opposite one another, on either side of the chamber.

The invention and the different applications thereof will be better understood on reading the description that follows and by examining the figures that accompany it.

BRIEF DESCRIPTION OF THE FIGURES

The figures are presented for indicative purposes and in no way limit the scope of the invention.

DETAILED DESCRIPTION

Figure 1:
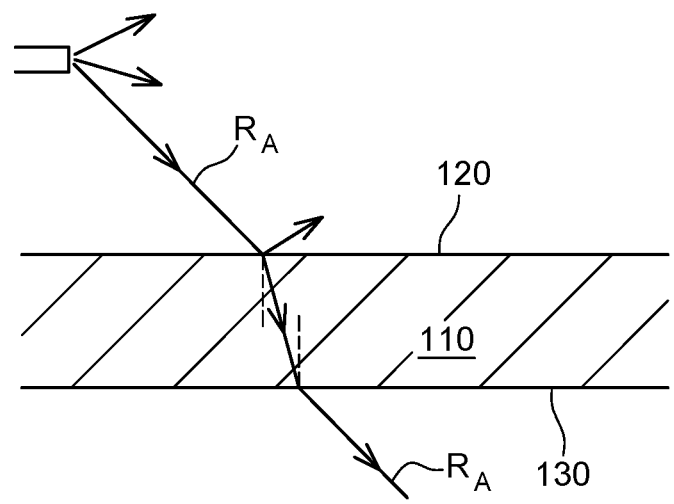
FIG. 1 schematically represents the path of a light ray, in a conventional photoacoustic characterisation device.
Figure 2:
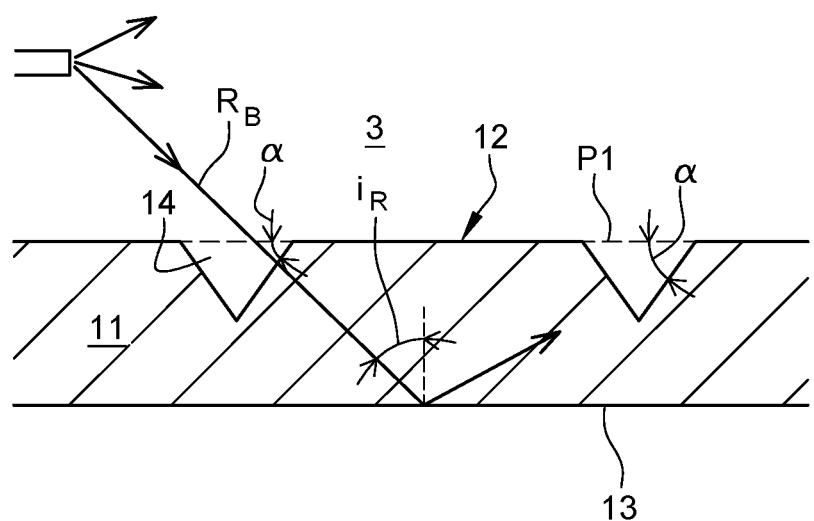
FIG. 2 schematically represents the path of a light ray, in a photoacoustic characterisation device implementing the teachings of the invention.

As already mentioned, the invention relates to, among other things, a device 1; 1' for the photoacoustic characterisation of a gaseous substance.

The device 1; 1' comprises, inter alia (see FIGS. 3, 6 and 21):
- a light source 2, configured to emit a light radiation,
- a chamber 3, intended to contain the gaseous substance to characterise,
- at least one fluidic port 4 for the admission of the gaseous substance in the chamber and/or for the discharge of this gaseous substance (this or these ports are not represented in FIGS. 3 to 7),
- at least one microphone (not represented in the figures), to acquire an acoustic wave, generated in the gaseous substance to be characterised by photoacoustic effect.

Here, the device 1; 1' is a compact, integrated device. It is produced by structuring (and functionalising) different substrates, in this case silicon substrates. Here, the chamber 3 is produced more particularly by sealing a first silicon substrate 10 and a second silicon substrate 20 one on the other, the second substrate 20 playing in some way the role of lid.

The device 1; 1' may comprise an additional chamber in addition to the aforementioned chamber 3, the two chambers then forming acoustic cavities coupled one to the other by capillaries to produce a detector of the "double differential Helmholtz" type, as described in the document FR 3019653. But the device 1; 1' may also comprise a single chamber (in this case, the chamber 3, mentioned above).

It will be noted that the invention relates not only to the device 1; 1' described above but also a similar device at an intermediate stage of its manufacture, said latter device already comprising the chamber 3 but not yet being provided with a microphone or a fluidic port, for example.

In a remarkable manner, at least one inner face of the chamber 3 is etched so that this face has particular recesses 14; 14', each of these recesses being delimited laterally by a lateral surface of which a part at least is tilted by a given tilt angle α with respect to an average plane P1, P2 of the inner face in question.

As explained in the section entitled "Summary of the invention", thanks to this tilt, the lateral surface of the recess 14; 14' deviates the light rays which encounter it, when refracting them, in a manner such that these light rays next encounter an outer face of the substrate under an angle of incidence sufficiently large so that there is total internal reflection on this outer face. These light rays are thus reflected back to the chamber 3. Etching such recesses on one at least of the inner faces of the chamber thus enables to reflect back to the chamber 3 a part of the light radiation which would otherwise exit therefrom. Since the light radiation is sent back to the chamber 3 by total internal reflection, problems of absorption and photoacoustic noise which would arise with the use of a reflective metal layer are thus avoided.

Figure 3:
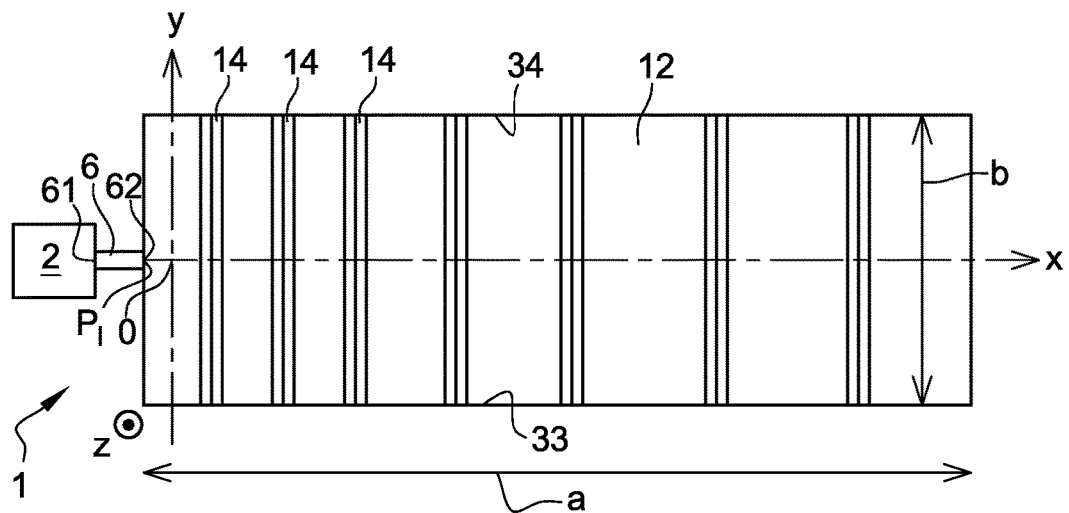
FIG. 3 schematically represents a photoacoustic characterisation device according to a first embodiment, seen from the side.
Figure 4:
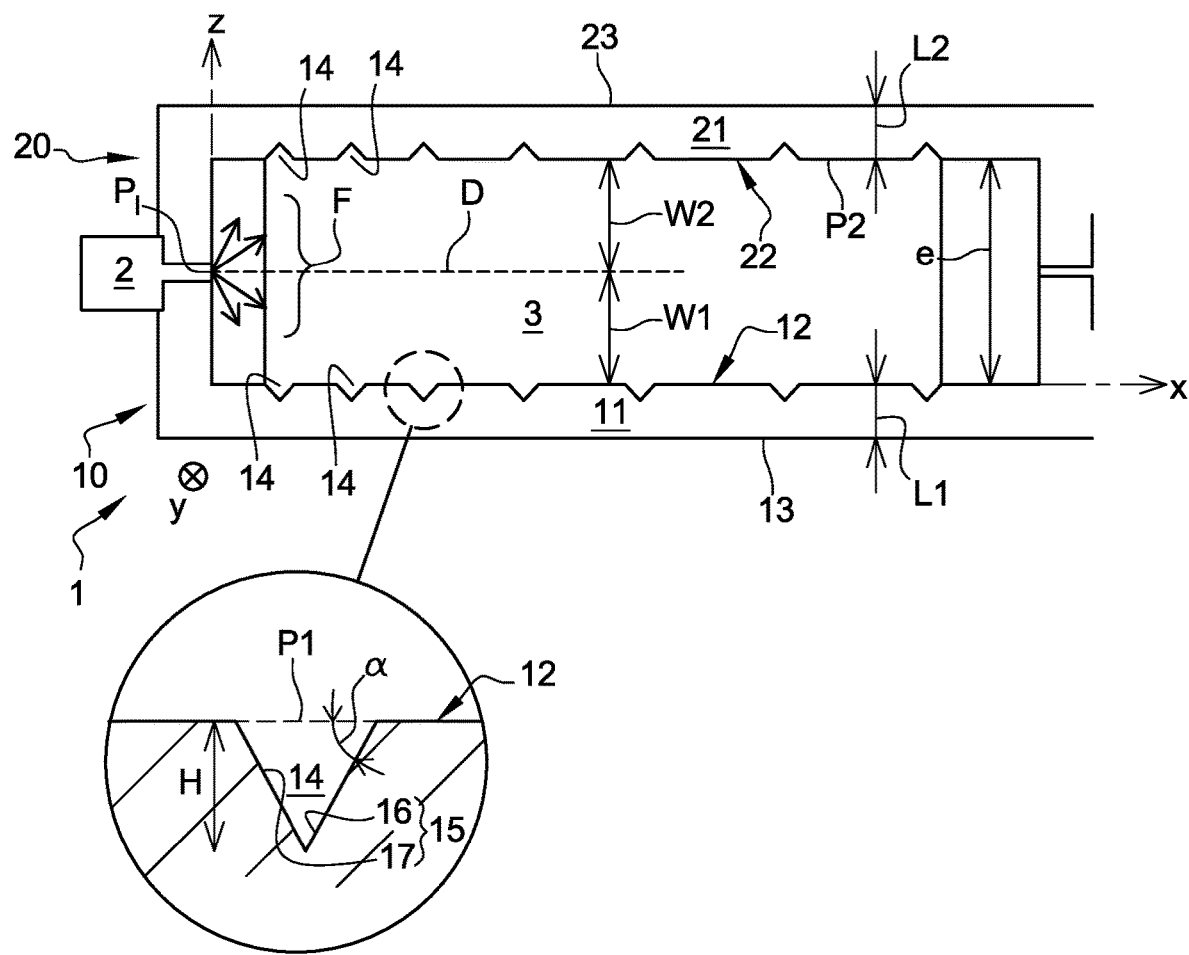
FIG. 4 schematically represents the device of FIG. 3, seen from the side.
Figure 6:
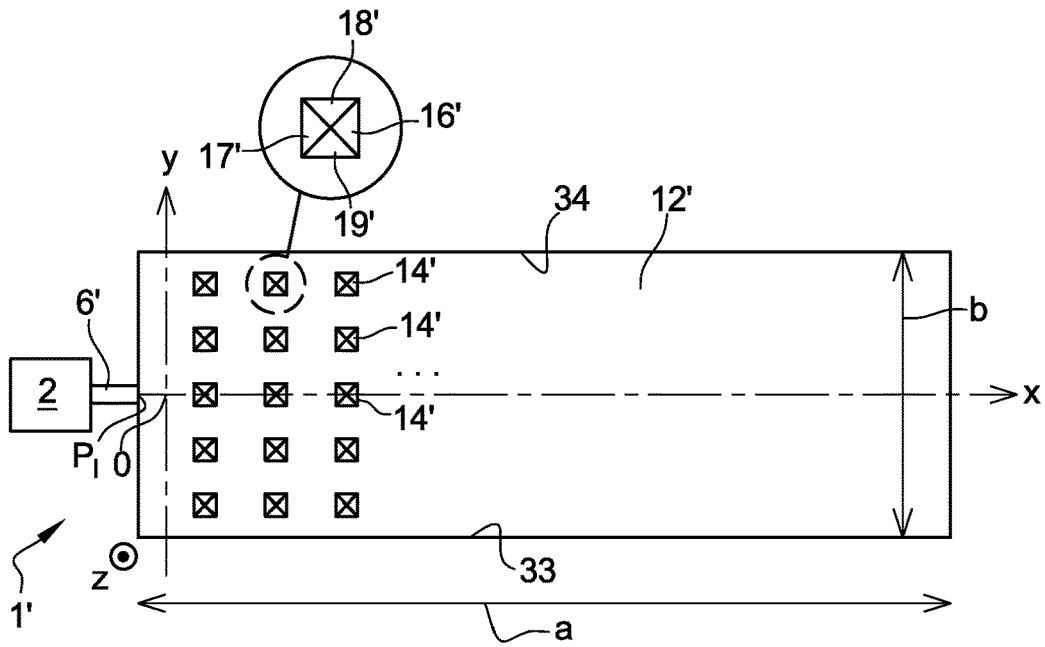
FIG. 6 schematically represents a photoacoustic characterisation device according to a second embodiment, seen from the side.
Figure 7:
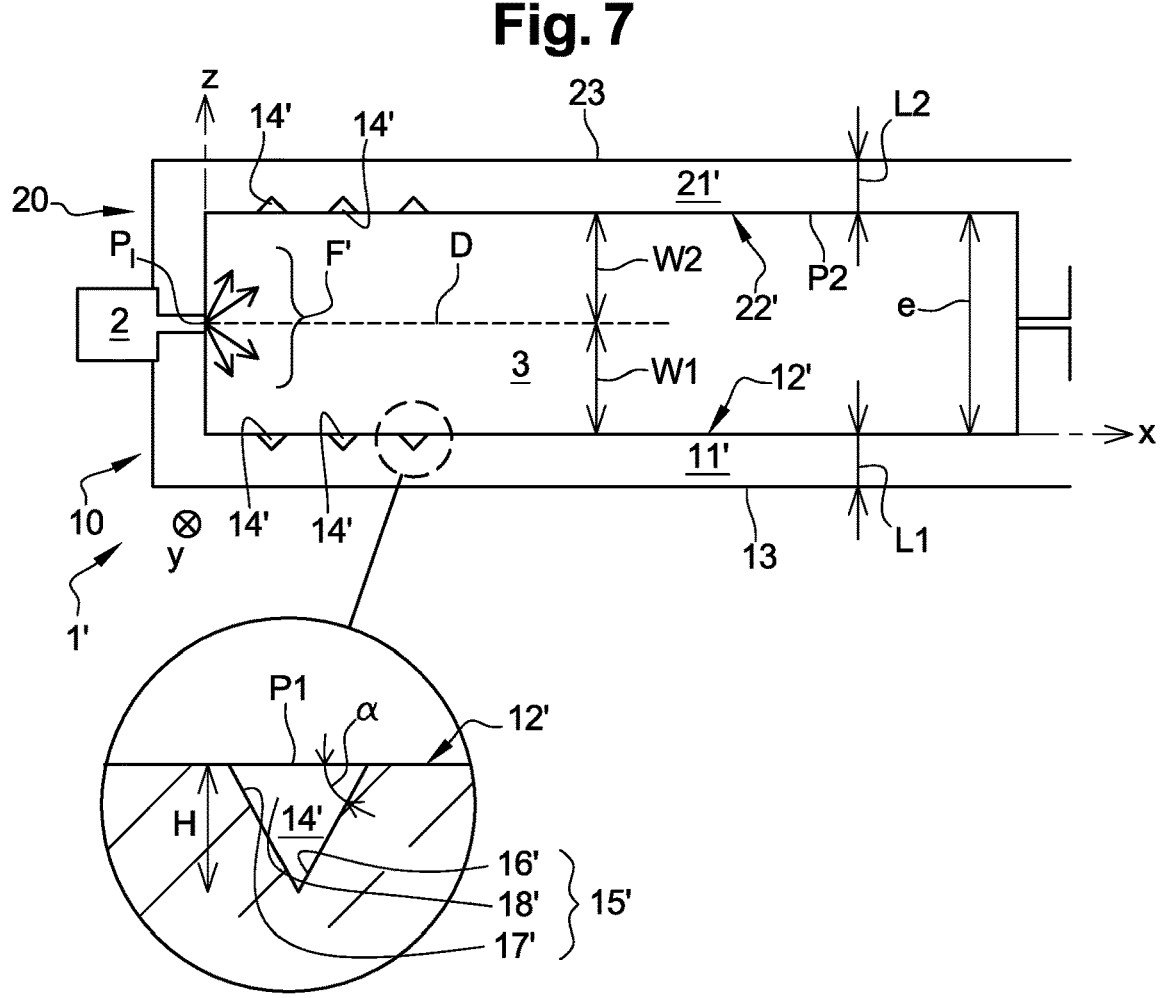
FIG. 7 is a partial schematic view of the device of FIG. 6, seen from the side.

A first embodiment of the device, 1, is schematically represented in FIGS. 3 and 4, and a second embodiment of the device, 1', is schematically represented in FIGS. 6 and 7. These two embodiments mainly differ from each other by the shape of the recesses 14; 14' mentioned above.

In the first embodiment, these recesses 14 are in the form of rectilinear grooves, in this case grooves with a V-shaped section. In the second embodiment, these recesses 14' are produced in the form of hollow pyramids (pyramid shaped holes), with a square base. These two embodiments have nevertheless numerous common points. Also, identical or corresponding elements of these two embodiments will be as far as possible marked by the same reference signs and will not be described each time.

In these two embodiments, the light source 2 of the device 1; 1' is a laser of the QCL (Quantum Cascade Laser) type. The light radiation that it emits has a spectrum situated mainly in the mid-infrared, for example between 3 microns and 10 microns.

The microphone(s) of the device may be MEMs (microelectromechanical system) type integrated microphones.

As for the chamber 3, it is delimited (FIGS. 4 and 7):
- on the one hand, by a first lower wall 11; 11', formed in the first substrate 10, and
- on the other hand, by a second upper wall 21; 21', formed in the second substrate 20.

The first wall 11; 11' and the second wall 21; 21' each have:
- an inner face 12, 22; 12', 22' situated on the side of the chamber 3, and
- an outer face 13, 23 substantially parallel to the inner face 12, 21; 12', 22' of the wall considered and situated outside of the chamber 3.

The first and second walls 11, 21; 11', 21' are substantially flat, in the sense that their outer and inner faces are themselves substantially flat and parallel to each other.

The outer and inner faces of each of the walls 11, 21; 11', 21' are substantially parallel with each other, in the sense that they form between them an angle less than 5 degrees. The outer face and the inner face of each of these walls 11, 21; 11', 21' may in particular, as here, be exactly parallel with each other.

The inner face 12; 12' of the first wall 11; 11' is substantially flat, in the sense that an entire part of this inner face is flat, situated in a same average plane P1 (see FIG. 4). But this face also comprises hollow, and potentially projecting, portions situated below or above the average plane P1. In other words, the inner face 12; 12' comprises several flat portions situated in a same plane, which constitutes the average plane P1, as well as portions situated outside of this plane. The portions of the inner face 12; 12' situated in this average plane P1 may represent here the major part of the area of this face (area measured in projection on the average plane P1).

The inner face 22; 22' of the second wall 21; 21' is also substantially flat, in the sense that an entire part of this inner face 22; 22' is flat, situated in a same average plane P2. This face comprises however, here again, hollow, and optionally projecting, portions situated below or above the average plane P2.

As for the outer faces 13, 23 of the first and second walls 11, 21; 11', 21', they are here completely flat, and parallel respectively to the average plane P1 and to the average plane P2.

The inner faces 12, 22; 12', 22' extend along a longitudinal axis x and along a transversal axis y (these two axes, x and y, are thus parallel, each, to the average plane P1 and to the average plane P2). Here, the inner faces 12, 22; 12', 22' each have an overall rectangular shape. The lengths of their sides, parallel to the longitudinal axis x, and, respectively, parallel to the transversal axis y, are noted a and b respectively (FIGS. 3 and 6). These lengths may, as here, be comprised between 3 and 20 millimetres.

The direction perpendicular to the average plane P1 of the inner face 12; 12' is identified as the normal axis z. The axes x, y and z introduced above are perpendicular two by two.

The inner faces 12 and 22, or 12' and, 22', which form the lower and upper limits of the chamber 3, are separated from each other by a distance e which may be comprised between 0.3 and 1.5 millimetres (the distance e is the distance, along the z axis, between the average plane P1 of the inner face 12; 12' on the one hand and the average plane P2 of the inner face 22; 22' on the other hand).

Here, the chamber 3 is thus more extended parallel to the inner faces 12, 22; 12', 22' than perpendicularly thereto and thus has an overall flattened shape.

The first and second walls 11 and 21, or 11' and 21', have respective thicknesses, noted L1 and L2, which may for example be comprised between 0.2 and 0.6 millimetres. The thickness L1 designates the distance between the average plane P1 and the outer face 13 of the first wall, and the thickness L2 designates the distance between the average plane P2 and the outer face 23 of the first wall.

Here, the chamber 3 is formed (FIGS. 4 and 21):
- of a lower half-cavity 31, formed in the first substrate 10 and of which the bottom is constituted by the inner face 12; 12' of the first wall 11; 11', and
- of an upper half-cavity 32, formed in the second substrate 20 and of which the bottom is constituted by the inner face 22; 22' of the second wall 21; 21'.

Each of these half-cavities is formed by depth etching of the corresponding substrate 10, 20. It is thus delimited by its bottom and by a lateral surface, while remaining open on the side opposite its bottom. The first and second substrates 10 and 20 are sealed one on the other while positioning the upper half-cavity 32 opposite the lower half-cavity 31, upright thereof.

The light source 2 is optically associated with the chamber 3, that is to say coupled thereto, so as to inject into the chamber 3 the light radiation that it emits, in the form of a light beam F; F'.

To do so, the light source 2 may for example be coupled to an integrated waveguide, 6 (FIG. 3). A first end 61 of the guide is then coupled to the light source 2. A second end 62 of the guide, through which the light beam F exits, emerges in the chamber 3. It is this solution which is implemented in the first embodiment, of FIGS. 3 and 4. The second end 62 of the guide may for example be situated at the junction between the two substrates 10 and 20.

The centre of the second end 62 of the guide, through which the light beam F exits, is called point of injection $P_i$ hereafter (this second end has a small section, with respect to that of the chamber 3; the light beam F is thus injected into the chamber from a localised zone, centred on the point of injection $P_i$).

The second end 62 of the guide may, as here, comprise a widened part and be provided with a decoupling diffraction grating, as is described for example in the document FR 3019653. This enables reducing the divergence of the light beam F. The diffraction grating may for example be orientated so that a mean direction of propagation of the light beam, D, at the outlet of the guide, is parallel to the longitudinal axis x, or at least does not depart by more than 20 degrees (or even 10 degrees) from the longitudinal axis x. The diffraction grating may be oriented furthermore so that the direction of lowest divergence of the light beam F is parallel to the transversal axis y. The light beam F then has a higher divergence parallel to the z axis (the beam then has a transverse section more elongated in the z direction than in the y direction). The light beam then propagates in some way in the form of a fan-shaped layer, which, parallel to the transversal axis y, is not very thick.

This arrangement enables reflections of the light beam on the inner faces of the chamber to take place essentially on the inner face 12 of the first wall 11 (lower inner face), and on the inner face 22 of the second wall 21 (upper inner face), rather than on the lateral inner faces 33 and 34 of the chamber 3 (lateral inner faces which are parallel to the plane (x,z)—see FIG. 3). This is interesting because, here, it is precisely the inner faces 12 and 22 which are provided with particular recesses 14, which enable efficient reflection of the light beam.

In the second embodiment, of FIGS. 6 and 7, the aforementioned waveguide is omitted. An outlet port of the light source 2, from where the light beam F' comes out, is then placed directly opposite an inlet port in the chamber, 6', (that is to say opposite an inlet opening in the chamber), without intermediate optical component. The light beam F' may then have quite important divergence, for example of several tens of degrees, not just parallel to the transversal axis y but also parallel to the normal axis z. Here, the inlet port of the light beam, 6', is situated at the junction between the two substrates 10 and 20. Here again, the light beam F' is injected into the chamber from a zone not very extended with respect to the section of the chamber (this zone corresponds for example to the inlet opening in question), centred on a point called point of injection $P_i$. As previously, the light beam F' has a mean direction of propagation D parallel to the longitudinal axis x, or at least does not depart by more than 20 degrees (or even 10 degrees) from the longitudinal axis x.

In the different embodiments considered here, a part of the light beam F; F' injected into the chamber 3 is reflected on the inner face 12; 12' of the first wall, and another part of this beam is reflected on the inner face 22; 22' of the second wall.

The inner face 12; 12' of the first wall 11; 11' is etched so as to have the aforementioned recesses 14; 14'. Each of these recesses is delimited laterally by a lateral surface 15; 15', a part 16; 16' of said lateral surface, which is illuminated by the light beam F; F', being tilted, with respect to the average plane P1 of said inner face 12; 12', by the aforementioned tilt angle α.

The inner face 22; 22' of the second wall 21; 21' is etched so as to have such recesses 14; 14' as well.

The tilt angle α satisfies the inequality F1 that has been described above in the section entitled "Summary of the invention":

$$\alpha - \sin^{-1}\left(\frac{\sin\alpha}{n}\right) > i_C. \quad (F1)$$

As already explained, choosing the tilt angle α sufficiently large, so that it satisfies this inequality, enables that each ray refracted by the part 16; 16' of the lateral surface 15; 15' in question next undergoes total internal reflection on the outer face 13, 23 of the wall considered 11, 21; 11', 21'.

To satisfy the condition F1, the tilt angle α is chosen so as to be greater than a limit tilt angle $\alpha_L$ which corresponds to the case of equality, in the formula F1:

$$\alpha_L - \sin^{-1}\left(\frac{\sin\alpha_L}{n}\right) = i_C. \quad (F5)$$

The material which forms the first and second walls is here silicon. In the wavelength domain considered here, comprised between 3 and 10 microns, this material has an optical index equal to 3.4. The critical angle $i_C$ is thus equal to around 17 degrees (c.f.: formula F3 indicated above), and the limit tilt angle $\alpha_L$ is then equal to around 24 degrees.

In these two embodiments, for each recess 14; 14', the lateral surface 15; 15' that laterally delimits the recess considered is formed of several flat facets 16, 17; 16', 17', 18', 19' (FIGS. 4 and 7). And each of these facets is tilted, with respect to the average plane P1, P2 of the inner face considered 12, 22; 12', 22', by said tilt angle α.

In the embodiment of FIGS. 3 and 4, for which the recesses 14 are produced in the form of V-shaped grooves, the facets 16 and 17 in question correspond to the two lateral faces of the groove considered (these faces join up with each other along the ridge which forms the bottom of the V-shaped groove).

And in the embodiment of FIGS. 6 and 7, for which the recesses 14' are produced in the form of hollow pyramids, the aforementioned facets 16', 17', 18', 19' correspond to the four faces of the pyramid considered.

For these two embodiments, the silicon substrates 10 and 20 are essentially monocrystalline ("essentially monocrystalline" substrate is taken to mean a substrate of which the major part of the volume, or even more than 90% of the volume, is monocrystalline, this substrate nevertheless being able to comprise a certain number of defects such as dislocations or insertions).

The inner faces 12, 22; 12', 22' have average planes P1 and P2 that are parallel to the crystalline planes of silicon of which the Miller indices are 1,0,0 (plane sometimes designated as the plane (100) in the literature), or 1,1,0 (plane (110)).

Furthermore, for these two embodiments, the recesses are produced by a wet etching process in the course of which the substrate 10, 20 is etched in an anisotropic manner (this anisotropic wet etching process will be described below, during the description of a method for manufacturing such a device). With this etching technique, the facets 16, 17; 16', 17', 18', 19' that laterally delimit the recesses 14; 14' obtained are each parallel to a crystalline plane of silicon, of which the Miller indices are 1,1,1 (sometimes also noted plane (111)) or 1,1,–1 or 1,–1,1 or instead –1,1,1.

Given the tilt of these crystalline planes, with respect to the crystalline plane of silicon of indices 1,0,0, or 1,1,0, the tilt angle α obtained here is equal to 54.7 degrees (it thus indeed satisfies the relationship F1, whereas it is greater than the limit tilt angle $\alpha_L$, which here is equal to around 24 degrees).

The arrangement of the recesses 14; 14', on the inner faces 11; 11' and 21; 21', will now be described, firstly for the first embodiment then for the second embodiment.

In the first embodiment (FIGS. 3 and 4), the grooves 14 are etched parallel to each other, and parallel to the transversal axis y.

They have a same depth H, comprised for example between 10 and 100 microns. The depth H designates the depth of each of these grooves, measured perpendicularly to the average plane P1, P2 of the inner face 12, 22 in which is etched the groove 14 (the depth H is the distance between the average plane P1, P2 and the bottom, that is to say the ridge, of the V-shaped groove).

The positions of the grooves 14 on the inner face 12 are marked, along the longitudinal axis x, by the coordinates $x_1, \ldots, x_i, x_{i+1}, \ldots$. The integer index i corresponds to the number of the groove considered. The first groove, of index i=1, is that which is the closest to the point of injection $P_i$ of the light beam (see FIG. 5). The coordinate $x_1$ marks more precisely the position of the bottom of groove number i, along the longitudinal axis x, of which the origin O is situated upright the point of injection $P_i$.

The first groove, of index i=1, is positioned on the inner face 12, as a function of the angular opening of the light beam F in the plane (x,z), so that the limit light ray, situated at the lower limit of the light beam F, encounters the facet 16 of this first groove. This limit light ray is, among the light rays of the light beam F, that which is the closest to the average plane P1 (the luminous intensity at the level of this limit ray being for example equal to half of the maximum of the luminous intensity in the light beam F).

It is next desirable to position the grooves 14 near to each other, with a relatively reduced spacing, so as to reduce the dimensions of the portions of the inner face 12 which are parallel to the outer face 13. Indeed, when a ray of the light beam F encounters the inner face 12 at the level of such a portion, parallel to the outer face 13, this ray comes out of the chamber, then the device, and no longer participates in the heating up of the gaseous substance to characterise (as with a device without recesses).

But, on the other side, if the grooves are too close to each other, a light ray refracted by the facet 16 of one of the grooves may reach the following groove and be reflected therefrom, instead of being reflected on the outer face 13. In this case, the light ray may be deviated rearwards by reflection on the following groove, in the direction of the source, this light ray then no longer participating in the heating up of the gaseous substance to characterise.

It is thus desirable that the grooves 14 are neither too spaced apart from one another, nor too close to one another. It is then possible to provide to arrange the grooves such that two grooves 14, of which the positions $x_{i+1}$ and $x_i$ along the longitudinal axis x immediately succeed each other, are spaced apart, along this longitudinal axis x, by a distance $d_i = x_{i+1} - x_i$ which is equal, to some 20%, or even better, to the quantity $d_{i,opt}$ defined by the following formula F6:

$$d_{i,opt} = H\left[\frac{1}{\tan\alpha} + \tan\left[\alpha + \sin^{-1}\left[\cos\left[\frac{\alpha + \tan^{-1}\left(\frac{W1 \cdot \tan\alpha}{x_i \tan\alpha + H}\right)}{n}\right]\right]\right]\right]. \quad (F6)$$

In this formula, the distance $W_1$ designates the distance between the point of injection $P_i$ of the light radiation into the chamber on the one hand, and the average plane P1 of the inner face 12 of the first wall 11 on the other hand. This distance is measured perpendicularly to the average plane P1 (FIG. 5).

The distance $d_{i,opt}$ is the smallest distance, between the grooves i and i+1, for which the light rays, refracted by the facet 16 of the groove i, reach the outer face 13, without encountering the facet 17 of the groove i+1 (without being retroreflected by this facet). This distance thus corresponds to a good compromise between a gap which would be too small (then leading to retro-reflection of an important part of the light radiation, in the wall 11) and a gap which would be too big (then increasing luminous power losses at the level of the outer face 13).

Figure 5:
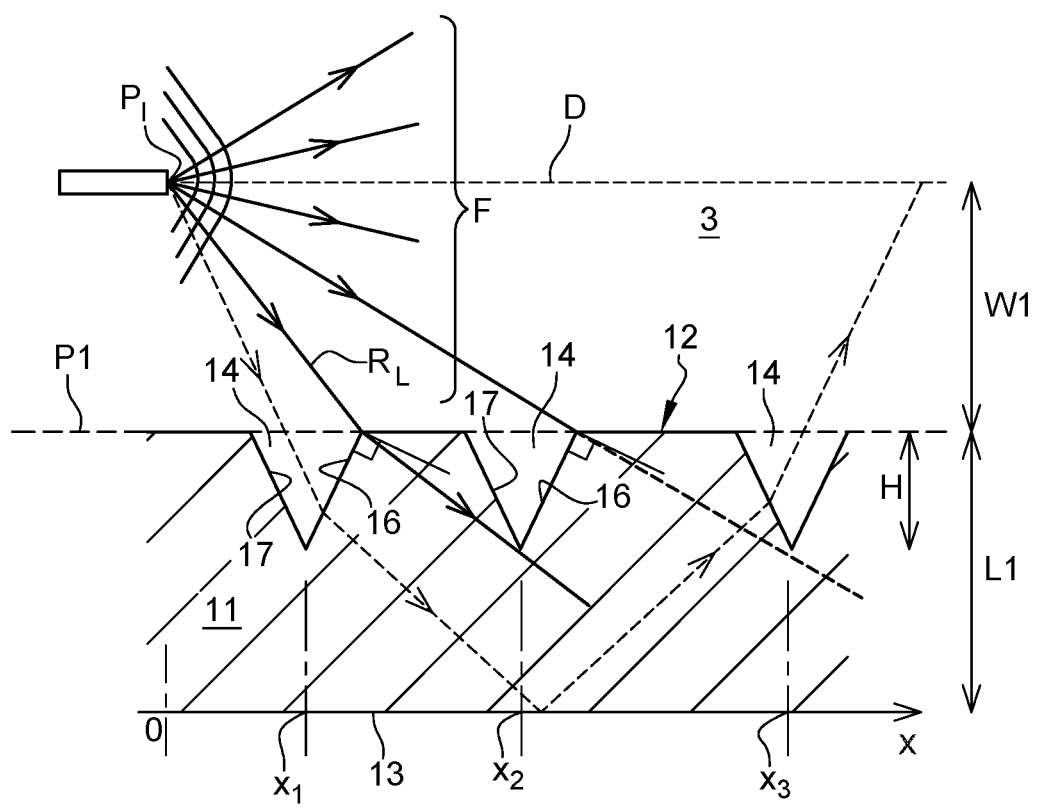
FIG. 5 schematically represents the path of a light ray, in the device of FIG. 3.

The case $x_{i+1} - x_i = d_{i,opt}$ is schematically represented in FIG. 5. The light ray $R_L$ represented in this figure is the ray which, among the rays refracted by the facet 16 of groove no 1, is the closest to the junction between the facet 16 and the average plane P1 (in some way, it is the highest ray, among these rays). It is thus the ray which is the most likely to encounter the facet 17 of the following groove, no 2. In this limit situation, this light ray $R_L$ passes just under the groove no 2 (while being at the limit of touching the bottom of this groove). It is this geometric construction that makes it possible to determine the expression of the distance $d_{i,opt}$, given by formula F6.

On the inner face 22 of the second wall 21, the grooves 14 are arranged as explained above for the inner face 12 of the first wall 11, but by replacing the distance $W_1$ by a distance $W_2$, in the formula F6, $W_2$ being the distance between the point of injection $P_i$ and the average plane P2 of the inner face 22 of the second wall 21.

In this embodiment, the lateral inner faces 33 and 34 of the chamber 3, which are parallel to the plane (x,z), are exempt of grooves. But, in an alternative, it could also be provided to also etch V-shaped grooves on these lateral faces, each groove being for example parallel to the normal axis z. Furthermore, in an alternative, it could be provided that only one of the two inner faces 12 and 22 is etched with grooves, instead, as here, of etching these two inner faces.

In the second embodiment (FIGS. 6 and 7), the pyramids 14' are etched so that, for each pyramid, two of the sides of the base (square) of the pyramid are parallel to the longitudinal axis x, the other two sides of this base being parallel to the transversal axis y. The pyramids 14' are thus arranged so that the sides of their respective bases are parallel with each other, from one pyramid to the other.

On each of the two inner faces 12' and 22', the pyramid-shaped recesses 14' are furthermore arranged so as to be aligned with each other (FIG. 6). These recesses 14' are thus arranged in lines and in columns, on each of the two inner faces 12' and 22' (in other words, the recesses are arranged at the nodes of a rectangular network). In FIGS. 6 and 7, for reasons of clarity, not all of the pyramids 14' are represented.

The depth, H, of the different recesses 14' is the same as previously. In this case, the depth H designates the distance between the average plane P1, or P2, and the summit of the pyramid 14' considered.

The positions of the pyramids 14' on the inner face 12' are marked, along the longitudinal axis x, by the coordinates $x_1, \ldots x_i, x_{i+1}, \ldots$, and, along the transversal axis y, by the coordinates $y_{-j}, \ldots, y_0, \ldots, y_j, y_{j+1}, \ldots$. The integer indices i and j correspond respectively to the column number and to the line number of the pyramid considered. The pyramid, of indices i=1 and j=0, is that which is the closest to the point of injection $P_i$ of the light beam. The pair of coordinates $(x_i, y_j)$ marks more precisely the position of the summit of the pyramid considered 14', of indices i and j, along the axes x and y, of which the common origin O is situated upright the point of injection $P_i$.

The line of pyramids 14' for which j=0 (central line) is situated here in the alignment of the point of injection $P_i$. The first column of pyramids 14' (those for which i=1) is positioned on the inner face 12' as a function of the angular opening of the light beam F' in the plane (x,z), so that the limit light ray, situated at the lower limit of the light beam F', encounters the facet 16 of the pyramid 14' of indices i=1, j=0.

As for the first embodiment, the recesses 14' are arranged, on the inner face 12', so that two recesses 14' (here two pyramids 14') of which the positions $x_{i+1}$ and $x_i$ along the longitudinal axis x follow each other immediately (i.e.: recess of indices (i,j), and, respectively, of indices (i+1,j)), are spaced apart, along this longitudinal axis x, by a distance $d_i = x_{i+1} - x_i$ which is equal, to some 20%, or even better, to the quantity $d_{i,opt}$ defined by the formula F6 given above. In this second embodiment, the distance $W_1$ that intervenes in formula F6 designates, here again, the distance between the point of injection $P_i$ and the average plane P1 of the inner face 12' of the first wall 11'.

As explained for the first embodiment, spacing the recesses 14' apart in this way makes it possible, in the chamber, to obtain a high average luminous power since this spacing limits potential retro-reflections inside the first wall 11', while corresponding to a quite important density of recesses on the inner face 12' (which limits lateral luminous losses, at the level of the outer face 13).

For the same reasons, the recesses 14' are arranged, on the inner face 12', so that two recesses 14' of which the positions $y_{j+1}$ and $y_j$ along the transversal axis y follow each other immediately (i.e. recess of indices (i,j), and of indices (i,j+1) respectively), are spaced apart, along this transversal axis y, by a distance $d_j = y_{j+1} - y_j$ which is equal, to some 20%, or even better, to the quantity $d_{j,opt}$ defined by the following formula F7:

$$d_{j,opt} = H \left[ \frac{1}{\tan\alpha} + \tan\left[\alpha + \sin^{-1}\left[\cos\left[\frac{\alpha + \tan^{-1}\left(\frac{W1 \cdot \tan\alpha}{y_j \tan\alpha + H}\right)}{n}\right]\right]\right] \right]. \quad (F7)$$

On the inner face 22' of the second wall 21', the pyramids 14' are arranged as explained above for the inner face 12' of the first wall 11', but by replacing the distance $W_1$ by a distance $W_2$, in formulas F6 and F7, $W_2$ being the distance between the point of injection $P_i$ and the average plane P2 of the inner face 22' of the second wall 21'.

Producing the recesses 14' in the form of hollow pyramids is well suited to the geometry that the light beam F' has, in this second embodiment. Indeed, unlike the first embodiment, the light beam F' is here quite highly divergent, not just in a direction parallel to the normal axis z but also in a direction parallel to the transversal axis y. Certain light rays of this beam may thus depart quite considerably from the plane (x,z). These light rays are then refracted by the left and right lateral facets 18', 19' of the pyramids, instead of being refracted by the front 16' and rear 17' facets of these pyramids, which makes it possible to obtain similar refraction conditions for the rays situated in the plane (x,z) (refracted by the front and read facets 16' and 17'), and for the rays which depart from this plane (refracted by the left and right facets 18', 19').

In this second embodiment, the lateral inner faces 33 and 34 of the chamber 3, which are parallel to the plane (x,z), are exempt of pyramids. But, in an alternative, it could however be provided to also etch pyramid-shaped recesses on these lateral faces, the sides of the bases of these pyramids each being for example parallel to the normal axis z, or to the longitudinal axis x. Furthermore, in an alternative, it could be provided that only one of the two inner upper and lower faces 12' and 22' is etched with pyramids, instead, as here, of etching these two inner faces.

Furthermore, in other embodiments, the inner lower face and/or the inner upper face of the chamber could be etched so as to have at one and the same time V-shaped grooves and pyramid-shaped recesses, such as described above. The recesses could be produced in another form than V-shaped grooves or hollow pyramids, from the moment that the recesses in question each remain delimited by a lateral surface which comprises a part, illuminated by said light beam and tilted by said the tilt angle α.

Figure 8:
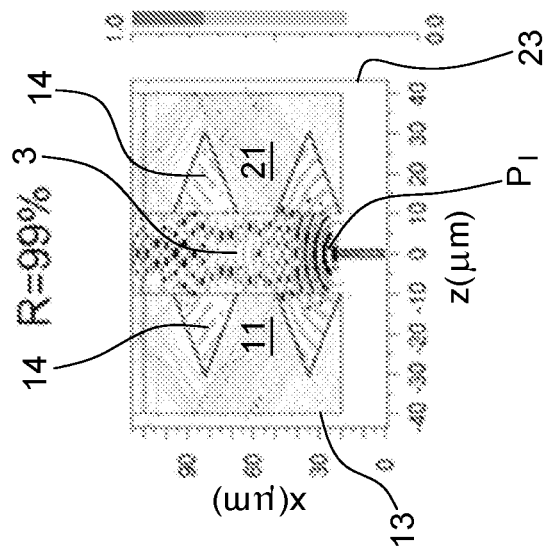
FIG. 8 shows the results of digital simulations, for a device implementing the teachings of the invention.
Figure 10:
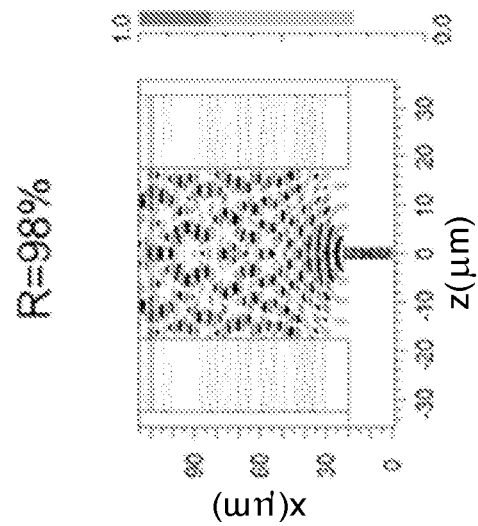
FIG. 10 shows the results of digital simulations, for yet another device, of the prior art.
Figure 9:
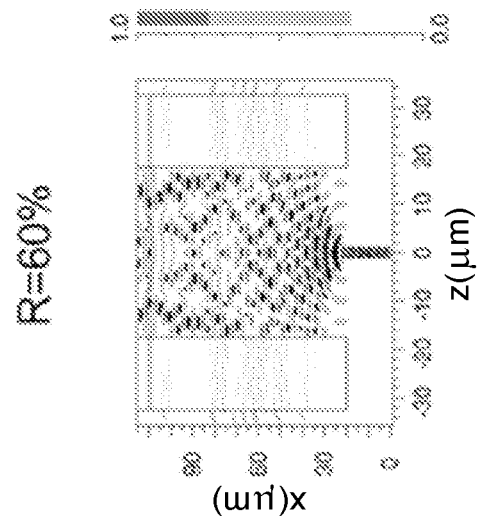
FIG. 9 shows the results of digital simulations, for another device.

FIGS. 8, 9 and 10 show the results of digital simulations which illustrate the interest of the device 1; 1' described above.

FIG. 8 is a sectional view, along a sectional plane parallel to the plane (x,z), of a device similar to the device 1 of the first embodiment but for which the thickness of the chamber is smaller than that which has been indicated above (thickness of 20 microns, in the case of this simulation). The V-shaped grooves for their part have a depth of 20 microns. In this figure, the amplitude of the electrical field associated with the light radiation injected into the chamber is represented in grey levels, which darken as the amplitude increases.

FIG. 9 is a sectional view, along a sectional plane parallel to the plane (x,z), of a device comparable to that of FIG. 8, but in which the inner faces of the first and second walls are exempt of grooves.

The results of these simulations have shown that, in the case of FIG. 8 (with grooves), the walls of the chamber each have an overall power reflection coefficient equal to around 99%. Whereas in the case of FIG. 9 (without grooves), each of these walls has an overall power reflection coefficient equal to around 60%. It is moreover possible to see, in FIG. 9, that a part of the luminous power injected into the chamber comes out of the device through the outer faces of the walls of the chamber.

FIG. 10 is a sectional view comparable to those of FIGS. 8 and 9, but for a device in which the inner faces of the chamber are completely flat (without grooves) and covered by a reflective gold layer. In this case, the power reflection coefficient is 98% for each wall, and the luminous power injected remains well confined in the chamber. But, as mentioned in the foreword, residual absorption in the reflective gold layer then generates bothersome photoacoustic noise These digital simulations, in particular that of FIG. 8, show that the grooves etched on the inner faces of the chamber indeed have the expected effect: they effectively make it possible to better confine in the chamber 3 the injected luminous power (with respect to flat inner faces and without reflective coating), and to do so by total internal reflection, thus without residual absorption.

A method making it possible to produce a device for the photoacoustic characterisation of a gaseous substance, such as the device 1, or 1', described above, will now be described, with reference to FIGS. 11 to 21.

Figure 11:
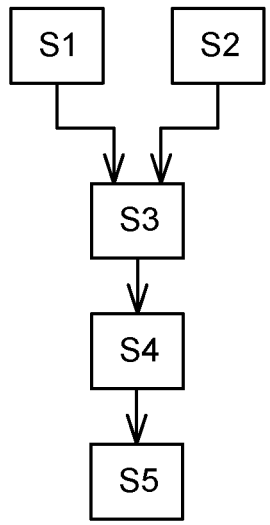
FIG. 11 schematically represents steps of a method for manufacturing a photoacoustic characterisation device implementing the teachings of the invention.

This method here comprises the following steps, schematically represented in FIG. 11:
  S1: structuring of the first substrate 10,
  S2: structuring of the second substrate 20,
  S3: once steps S1 and S2 have been carried out, sealing of the second substrate 20 on the first substrate 10,
  S4: thinning of the device 1; 1', to the desired thickness,
  S5: producing fluidic ports 4 for bringing in and evacuating the gaseous substance to characterise, and producing ports 5 for the passage, to one or more microphones, of the acoustic wave generated in the chamber.

Figure 21:
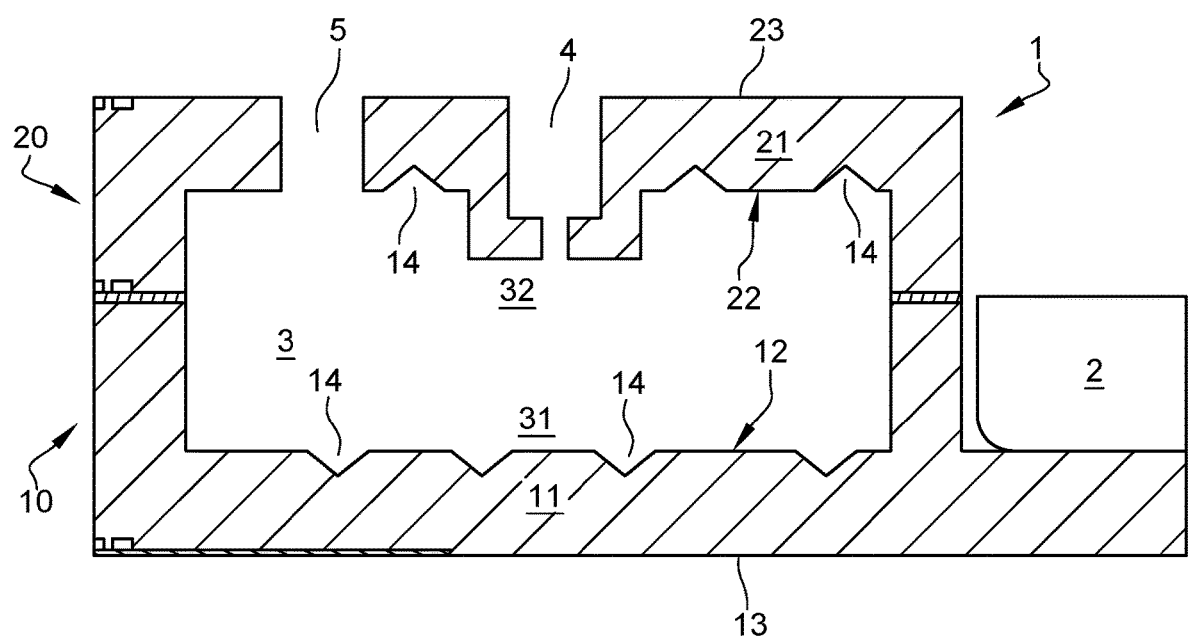
FIG. 21 schematically represents the characterisation device, of which a part is formed by the substrate in question.

FIG. 21 schematically represents the device 1, such as it is obtained at the end of step S5, seen from the side (section along the plane (x,z)).

Before structuring, each of the two substrates 10 and 20 is a monocrystalline silicon substrate, of which the faces are parallel to a crystalline plane of which the Miller indices are 1,0,0 or 1,1,0, and which may be polished either on a single face (SSP, single-side polished, type substrate), or on both faces (DSP, double-side polished, type substrate), making it possible to obtain a device of which the structure is even better defined. Each of these substrates has for example a (standard) thickness of 725 microns, initially.

Figure 12:
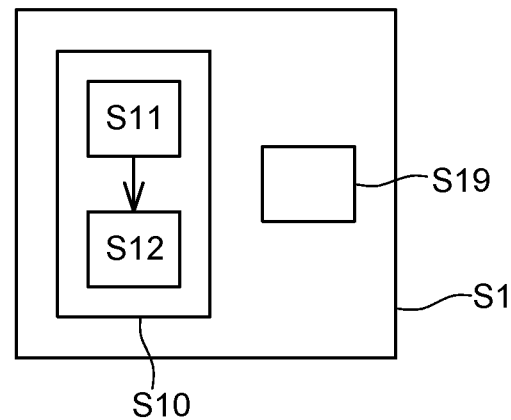
FIG. 12 represents in greater detail one of the steps of the method of FIG. 11.

The light source 2 is here produced by structuring of a part of the first substrate 10, during a step S19 of step S1 (FIG. 12).

Step S1 furthermore comprises a step S10 of producing the lower half-cavity 31 of the chamber 3, by etching of the first substrate 10.

Figure 13:
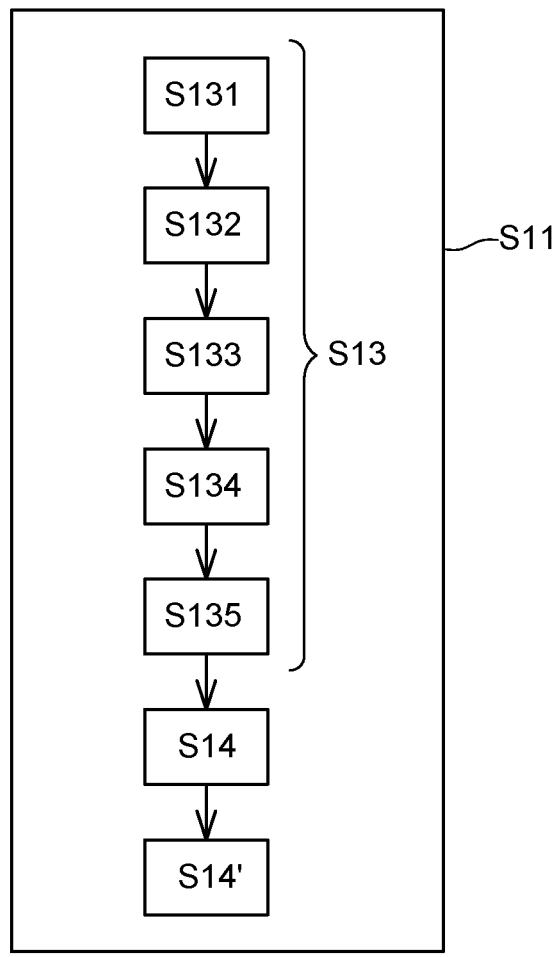
FIG. 13 schematically represents a sequence of operations carried out in the course of the step of FIG. 12.
Figure 14:
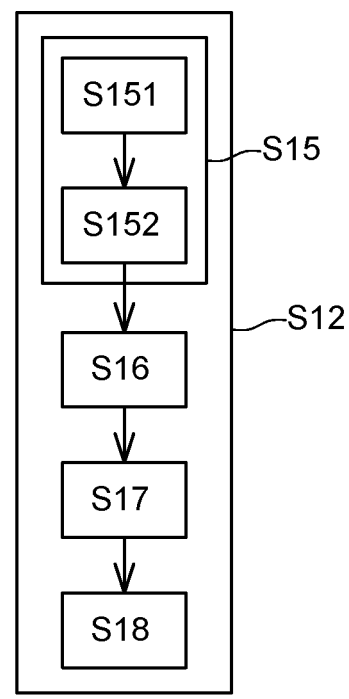
FIG. 14 schematically represents other operations carried out in the course of the step of FIG. 12.

It is this step S10 which is now described in detail, with reference to FIGS. 12 to 20. FIGS. 12 to 14 schematically represent sequences of operations carried out in the course of step S10, whereas FIGS. 15 to 20 show the first substrate 10 at different stages of the production of the half-cavity 31.

As may be seen in FIG. 12, step S10 of producing the lower half-cavity 31 here comprises:
- a step S11 of deep etching the first substrate 10, to define the lower volume of the lower half-cavity 31, then
- a step S12 of producing recesses 14; 14', on the bottom 12; 12' of this half-cavity.

As already indicated, it is the bottom of the lower half-cavity 31 that here forms the inner face 12; 12' of the first wall 11, mentioned above in the description of the device 1; 1'.

Step S11 of deep etching the first substrate 10 may be executed by carrying out the following steps (FIG. 13):
- S13: producing a hard mask 40, which extends around a surface which, after etching, will form the upper opening of the half-cavity 31,
- S14: deep etching the substrate, through this hard mask 40 (FIG. 15), and
- S14': removing a polymer layer, previously deposited on the faces of the half-cavity in the course of the deep etching step S14.

The etching carried out at step S14 is a deep dry etching, directive (anisotropic), for example of DRIE (Deep Reactive Ion Etching) type. This etching is carried out over a depth comprised for example between 300 and 450 microns, the depth which will be that of the half-cavity 31 obtained finally.

The hard mask 40 produced at step S13 may be a mask made of silica $SiO_2$, having a thickness of several microns, for example comprised between 3 and 4.5 microns, for the etching depths indicated above. This thickness makes it possible to give the hard mask sufficient resistance to the DRIE to etch in depth the first substrate 10 (over a depth of around 300 to 450 microns), without making this mask (which protects the parts of the substrate which are not to be etched) totally disappear.

Step S13 may for example comprise the following steps (FIG. 13):
- S131: depositing a layer of silica $SiO_2$ of several microns thickness (for example 3 microns thickness; this deposition may for example be a PECVD (Plasma Enhanced Chemical Vapour Deposition), the source of silicon used for the deposition being for example tetraethoxysilane, or TEOS, then
- S132: depositing a photosensitive resin, here a positive resin, on the silica layer, then
- S133: photolithography of the resin (exposure to light, development, and removal of the light exposed resin), to define the zones of the silica layer to etch, then
- S134: etching the silica layer, then
- S135: removing the remaining photosensitive resin.

Figure 15:
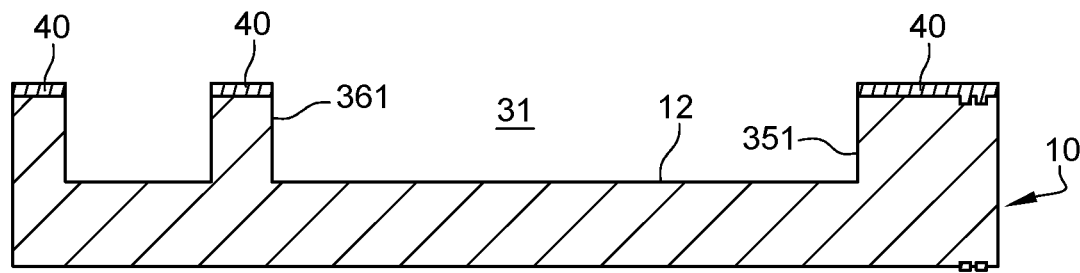
FIG. 15 is a schematical sectional view of a substrate, used as a basis for the manufacture of a characterisation device implementing the teachings of the invention, after a step of deep etching of a half-cavity, in the substrate.

FIG. 15 schematically shows the first substrate 10, seen from the side, after step S11 of deep etching. After this step, the lower half-cavity 31 is delimited by its bottom 12 and by lateral faces, for example four in number (if the chamber has a rectangular bottom). Two of these lateral faces, 351, 361, are visible in FIG. 15.

As for step S12 of producing recesses 14; 14', it here comprises the following steps (FIG. 14):
- S15: producing a protective layer 41 that covers the different lateral faces (including 351 and 361) of the half-cavity 31 (FIGS. 16 and 17), then
- S16: depositing a protective mask 42, on the bottom 12 of the half-cavity 31, the protective mask 42 being deposited through a stencil 43 and comprising orifices 44 coinciding with the openings of the recesses 14; 14' to etch (FIG. 18), then
- S17: wet etching the substrate, through the protective mask 42, by action of potassium hydroxide KOH or tetramethylammonium hydroxide TMAH, to etch the recesses 14; 14', then
- S18: removing the protective mask 42 and the protective layer 41.

The protective mask 42 and the protective layer 41 are here formed of silicon nitride $Si_3N_4$, which confers thereon good resistance to the wet etching carried out at step S17.

Step S15 may for example comprise the following operations:
- S151: depositing silicon nitride $Si_3N_4$, on all of the lateral faces and the bottom of the half-cavity 31, by LPCVD (Low Pressure Chemical Vapour Deposition), then
- S152: eliminating the silicon nitride $Si_3N_4$ deposited on the bottom 12 of the half-cavity 31, by dry etching of RIE (Reactive Ion Etching) type.

Figure 16:
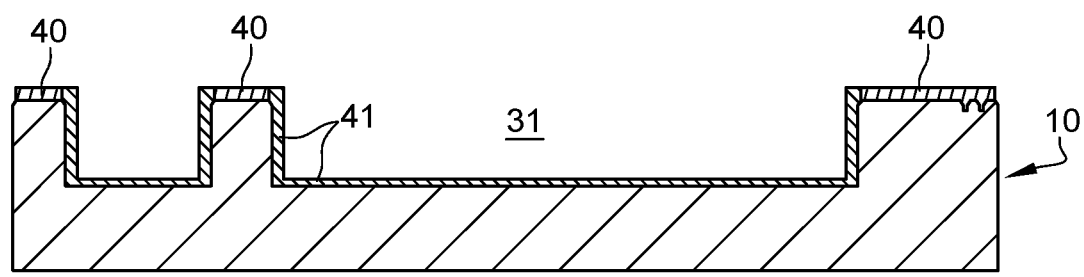
FIG. 16 schematically represents the substrate of FIG. 15, at another stage of its structuring process.
Figure 17:
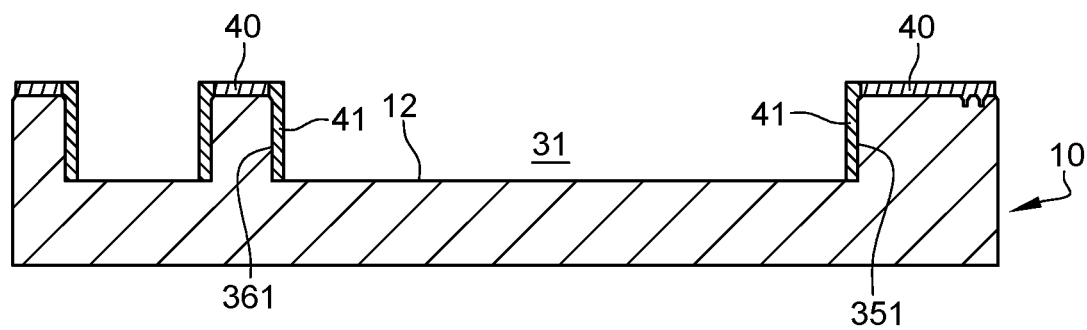
FIG. 17 schematically represents the substrate of FIG. 15, after producing a protective layer protecting the lateral faces of the half-cavity.
Figure 18:
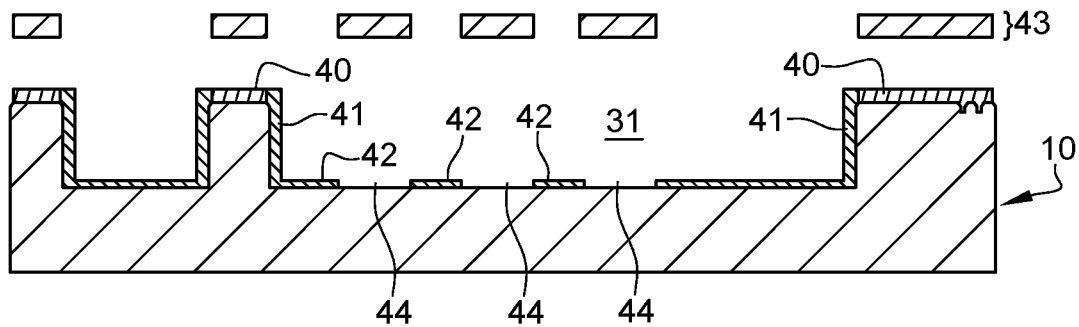
FIG. 18 schematically represents the substrate of FIG. 15, after producing a protective mask protecting the bottom of the half-cavity.
Figure 19:
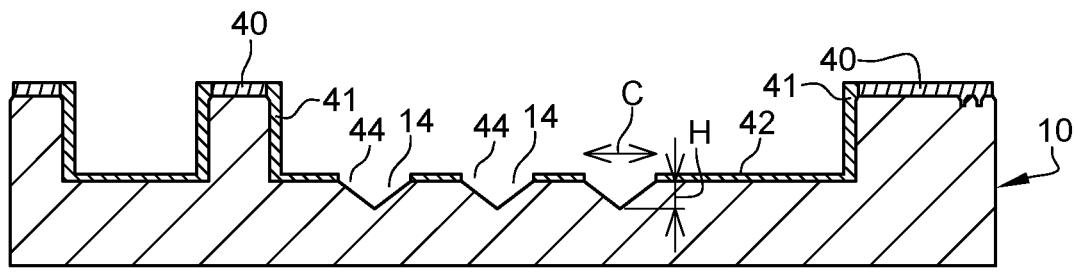
FIG. 19 schematically represents the substrate of FIG. 15, after etching recesses on the bottom of the half-cavity.
Figure 20:
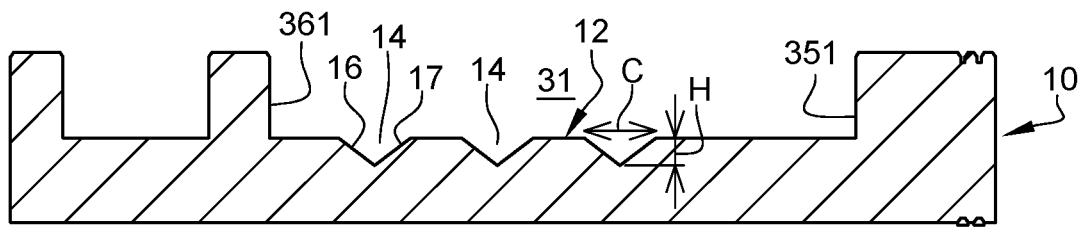
FIG. 20 schematically represents the substrate of FIG. 15, after etching recesses and removing the layer and the protective mask.

FIG. 16 schematically shows the substrate 10, just after the deposition operation S151. FIG. 17 shows this substrate just after the removal of the silicon nitride which had been deposited on the bottom 12.

At step S16, the stencil 43 employed is for example a metal stencil, or a silicon stencil. The dimensions of the patterns present on this stencil are chosen as a function of the desired dimensions for the orifices 44 of the protective mask 42.

The dimensions of the orifices 44 present in the protective mask 42 are chosen as a function of the desired dimensions for the openings of the recesses 14; 14' (they are equal to the desired dimensions for the openings of the recesses 14; 14'). For example, if it is wished to obtain V-shaped grooves having a width of 28 microns (in the average plane P1), the protective mask will be produced so that it has orifices in the form of rectilinear strips, also having a width C of 28 microns.

As for the depth H of the recesses 14; 14' etched in the substrate 10, it is in some way self-limited, and depends directly on the dimensions of the orifices 44, for example their width C. Indeed, the wet etching of silicon by potassium hydroxide or by TMAH is anisotropic, and the faces obtained after etching, which laterally delimit the recesses 14; 14', correspond to crystalline planes of which the Miller indices are 1,1,1 or 1,1,−1, or 1,−1,1, or −1,1,1 (the density of atoms in these crystalline planes is greater than in the crystalline planes of index 1,1,0 and 1,0,0; the etching is thus slower in a direction perpendicular to one of the planes 1,1,1, or 1,1,−1, or 1,−1,1, or −1,1,1, which explains why the faces which subsist after etching have the orientation indicated above).

As already indicated, the lateral faces of the recesses are thus tilted by 54.7 degrees with respect to the average plane P1 of the inner face 12 (given the respective orientations of the aforementioned crystalline planes). For orifices 44 in the form of rectilinear strips, of width C, the depth H of the V-shaped grooves will thus be self-limited to $(C/2) \times \tan(\alpha) = (C/2) \times \tan(54.7°)$. Thus, if it is wished to obtain a depth H of 20 microns, for example, then a protective mask will be deposited of which the orifices, in the form of strips, have a width C of 28.3 microns.

As for the wet etching step S17, it is for example carried out in accordance with the indications given in section 2.2 "Gravure chimique" of the document "*Micro-usinage des matériaux monocristallins*", by Jean-Sébastien DANEL, *Techniques de l'ingénieur*, article BM 7 290, July 1998.

Finally, at step S18, the removal of the protective mask 42 and the protective layer 41 may be carried out by chemical attack with hydrofluoric acid HF, for example. In the course of this step, the hard mask 40 is also removed (by the chemical attack in question).

The upper half-cavity 32, produced in the second substrate 20 in the course of step S2, is produced in the same way as the lower half-cavity 31, by the same sequence of steps. The upper half-cavity 32 may nevertheless have a depth different to that of the lower half-cavity 31, and the recesses may be arranged differently on the bottom 22 of the upper half-cavity 32, and on the bottom 12 of the lower half-cavity 31.

Once the two half-cavities 31 and 32 have been produced, the first and second substrates 10 and 20 are sealed one on the other, at step S3. This sealing is caned out by direct bonding of the substrates 10 and 20 one on the other. Beforehand, the substrates 10 and 20 are cleaned to be exempt of impurities (which may be of particular origin, organic and/or ionic). This cleaning may be wet chemical cleaning, cleaning by ultraviolet radiation and ozone, or be carried out by plasma treatment. Before being sealed, the substrates 10 and 20 are positioned one with respect to the other such that the lower half-cavity 31 and the upper half-cavity 32 are situated facing each other, that is to say opposite each other (each lateral wall of the upper half-cavity then extending in the extension of one of the lateral walls of the lower cavity). This alignment is achieved by means of alignment marks, produced on each of the two substrates 10 and 20 at the start of their structuring process.

In FIG. 21 may be seen the device 1, after sealing of the two substrates 10 and 20 one on the other, and after step S5 of producing the fluidic ports 4 and the ports for microphones 5. It will be noted that this figure, intended to illustrate the general structure of the device after sealing, is very schematic: it is not necessarily to scale, and all the parts of the device are not necessarily represented in this figure (this is furthermore also the case for FIGS. 3 to 7).

Different alternatives may be made to the manufacturing method that has been described. This method may in particular comprise additional steps or sub-steps, before or after the sealing of the two substrates. Certain steps could be carried out differently from that which has been described above.

For example, the protective mask which covers the bottom of the half-cavity considered, to protect it during wet etching, could be produced by photolithography (for example of Spray type) instead of being deposited through a stencil. This alternative is however quite awkward to implement and requires specific photolithography systems. Indeed, the orifices 44 present in the protective mask must then be defined by photolithography at the cavity bottom, at an important depth with respect to the upper face of the substrate (generally more than 300 microns), which makes the focusing of the lithography light beam awkward.

The invention claimed is:

1. A device for photoacoustic characterization of a gaseous substance, the device comprising:
a light source adapted to emit a light radiation, and
a chamber intended to contain the gaseous substance to characterize, the chamber being delimited at least in part by a first wall, formed of a material at least partially transparent to said radiation, said first wall having:
an inner face, substantially flat, situated on a side of the chamber, and
an outer face, a major part of the outer face being flat, contained in a same plane, and being substantially parallel to an average plane of the inner face,
the light source being optically associated with the chamber so as to inject said light radiation into the chamber, in the form of a light beam, a part at least of the light beam being reflected on the inner face of the first wall, wherein the inner face of the first wall is etched so as to have recesses, each recess being delimited laterally by a lateral surface, a part of said lateral surface, which is illuminated by said light beam, being tilted, with respect to the average plane of said inner face, by a tilt angle a of less than 90 degrees and which satisfies the following inequality:

$$\alpha - \sin^{-1}\left(\frac{\sin\alpha}{n}\right) > i_C$$

where $i_c$ is the critical angle of total internal reflection in said material and where n is the optical index of said material.

2. The device according to claim 1, wherein, for at least some of said recesses, the lateral surface that delimits the recess considered is formed of several flat facets.

3. The device according to claim 2, wherein each of said flat facets is tilted, with respect to the average plane of said inner face, by said tilt angle α.

4. The device according to claim 2, wherein at least some of said recesses, of which the lateral surface is formed of several flat facets, are in the form of rectilinear grooves having a V-shaped section.

5. The device according to claim 4, wherein said grooves are parallel with each other, and wherein each of said grooves extends along a transversal axis which forms, with a mean direction of propagation of the light beam injected into the chamber, an angle comprised between 70 and 90 degrees.

6. The device according to claim 5, wherein said grooves are arranged such that two grooves, situated one following the other along a longitudinal axis (x), are spaced apart, along the longitudinal axis (x), by a distance $d_i = x_{i+1} - x_i$ which is equal, at least within 20%, to the following quantity $d_{i,opt}$:

$$d_{i,opt} = H\left[\frac{1}{\tan\alpha} + \tan\left[\alpha + \sin^{-1}\left[\cos\left[\frac{\alpha + \tan^{-1}\left(\frac{W \cdot \tan\alpha}{x_i \tan\alpha + H}\right)}{n}\right]\right]\right]\right]$$

where
the coordinates $x_i$ and $x_{i+1}$ denote the respective positions, along the longitudinal axis, of the two bottoms of said two V-shaped grooves,
the longitudinal axis (x), which is orthogonal to said transversal axis (y) and which is contained in the average plane of said inner face, has an origin which is situated upright a point of injection of said light radiation,
H is the depth of the V-shaped grooves, measured perpendicularly to the average plane of said inner face, and
W is the distance between the point of injection of the light radiation and the average plane of said inner face, measured perpendicularly to said average plane.

7. The device according to claim 2, wherein at least some of said recesses, of which the lateral surface is formed of several flat facets, have a hollow pyramid shape with a square or rectangular base.

8. The device according to claim 7, wherein said pyramids are each arranged such that one of the sides of their base is parallel to a same transversal axis, and wherein said transversal axis forms, with a mean direction of propagation of the light beam injected into the chamber, an angle comprised between 70 and 90 degrees.

9. The device according to claim 8, wherein said pyramids are arranged such that two pyramids, situated one following the other along a longitudinal axis (x), are spaced apart, along the longitudinal axis (x), by a distance $d_i = x_{i+1} - x_i$ which is equal, at least within 20%, to the following quantity $d_{i,opt}$:

$$d_{i,opt} = H \left[ \frac{1}{\tan\alpha} + \tan\left[ \alpha + \sin^{-1}\left[ \cos\left[ \frac{\alpha + \tan^{-1}\left( \frac{W \cdot \tan\alpha}{x_i \tan\alpha + H} \right)}{n} \right] \right] \right] \right]$$

where the coordinates $x_i$ and $x_{i+1}$ denote the respective positions, along the longitudinal axis (x), of the two summits of said two pyramids, the longitudinal axis (x), which is orthogonal to said transversal axis (y) and which is contained in the average plane of said inner face, has an origin which is situated upright a point of injection of said light radiation, H is the depth of the pyramids, measured perpendicularly to the average plane of said inner face, and W is the distance between the point of injection of the light radiation and the average plane of said inner face, measured perpendicularly to said average plane.

10. The device according to claim 2, wherein the first wall is formed in an essentially monocrystalline substrate, wherein the average plane of said inner face, and said flat facets, are parallel to different crystalline planes of said substrate.

11. The device according to claim 10, wherein the substrate is formed of silicon, wherein the average plane of said inner face is parallel to a crystalline plane of which the Miller indices are 1,0,0 or 1,1,0 and wherein said facets are parallel to crystalline planes of which the Miller indices are 1,1,1, or 1,1,−1, or 1,−1,1 or −1,1,1.

12. The device according to claim 1, wherein the chamber is also delimited by a second wall formed in said material, the second wall having an inner face, substantially flat, situated on the side of the chamber, and an outer face, substantially flat and parallel to the inner face of the second wall, the inner face of the second wall being etched so as to have also recesses, each recess being delimited laterally by a lateral surface, a part of said lateral surface, which is illuminated by said light beam, being tilted, with respect to an average plane of the inner face of the second wall, by said tilt angle α.

13. The device according to claim 1, wherein the inner face of the first wall is devoid of a reflective metal coating.

14. A method for manufacturing a device for the photoacoustic characterization of a gaseous substance, the method comprising:

$$\left( \frac{\sin\alpha}{n} \right) > i_c$$

producing a chamber intended to contain the gaseous substance to characterize, the chamber being delimited at least in part by a first wall, formed in a material, said first wall having an inner face, substantially flat and situated on a side of the chamber, as well as an outer face, the major part of the outer face being flat, contained in a same plane, and being substantially parallel to an average plane of said inner face, producing, or mounting on the device, a light source that emits a light radiation, the light source being optically associated with the chamber so as to inject said light radiation into the chamber, in the form of a light beam, a part at least of the light beam being reflected on the inner face of the first wall, wherein producing the chamber comprises producing recesses, etched on the inner face of the first wall, each recess being delimited laterally by a lateral surface, a part of said lateral surface, which is illuminated by said light beam, being tilted, with respect to the average plane of said inner face, by a tilt angle a of less than 90 degrees and which satisfies the following inequality:

$$\alpha - \sin^{-1}\left( \frac{\sin\alpha}{n} \right) > i_C$$

where $i_c$ is the critical angle of total internal reflection in said material and where n is the optical index of said material.

15. The method according to claim 14, wherein the first wall is formed in a first substrate, and wherein producing the chamber comprises etching a half-cavity, in the first substrate, the half-cavity having a bottom forming said inner face, the step of producing said recesses being executed after the step of etching the half-cavity.

16. The method according to claim 15, wherein the first substrate is formed of essentially monocrystalline silicon, wherein the cavity bottom is parallel to a crystalline plane of which the Miller indices are 1,0,0 or 1,1,0, and wherein producing said recesses comprises the following operations:

producing a protective layer covering the lateral faces of said half-cavity, depositing a protective mask on the bottom of said half-cavity, the mask being deposited through a stencil and comprising orifices coinciding with the openings of the recesses to be etched, wet etching the first substrate, by action of potassium hydroxide or tetramethylammonium hydroxide, removing the protective mask and the protective layer.

17. The method according to claim 15, wherein, the chamber being further delimited by a second wall, which is formed in a second substrate made of said material, the second wall having an inner face, substantially flat, situated on the side of the chamber, and an outer face, substantially flat and parallel to the inner face of the second wall, wherein producing the chamber further comprises:
- producing recesses, etched on the inner face of the second wall, each recess being delimited laterally by a lateral surface, a part of said lateral surface, which is illuminated by said light beam, being tilted, with respect to an average plane of the inner face of the second wall, by said tilt angle $\alpha$, and
- sealing the second substrate on the first substrate, so that the respective inner faces of the first wall and the second wall are situated opposite one another, on either side of the chamber.

* * * * *